April 2, 1957 L. R. HEIM 2,787,048
METHOD OF MAKING SELF-ALIGNING BEARINGS
Filed Aug. 20, 1953 3 Sheets-Sheet 1
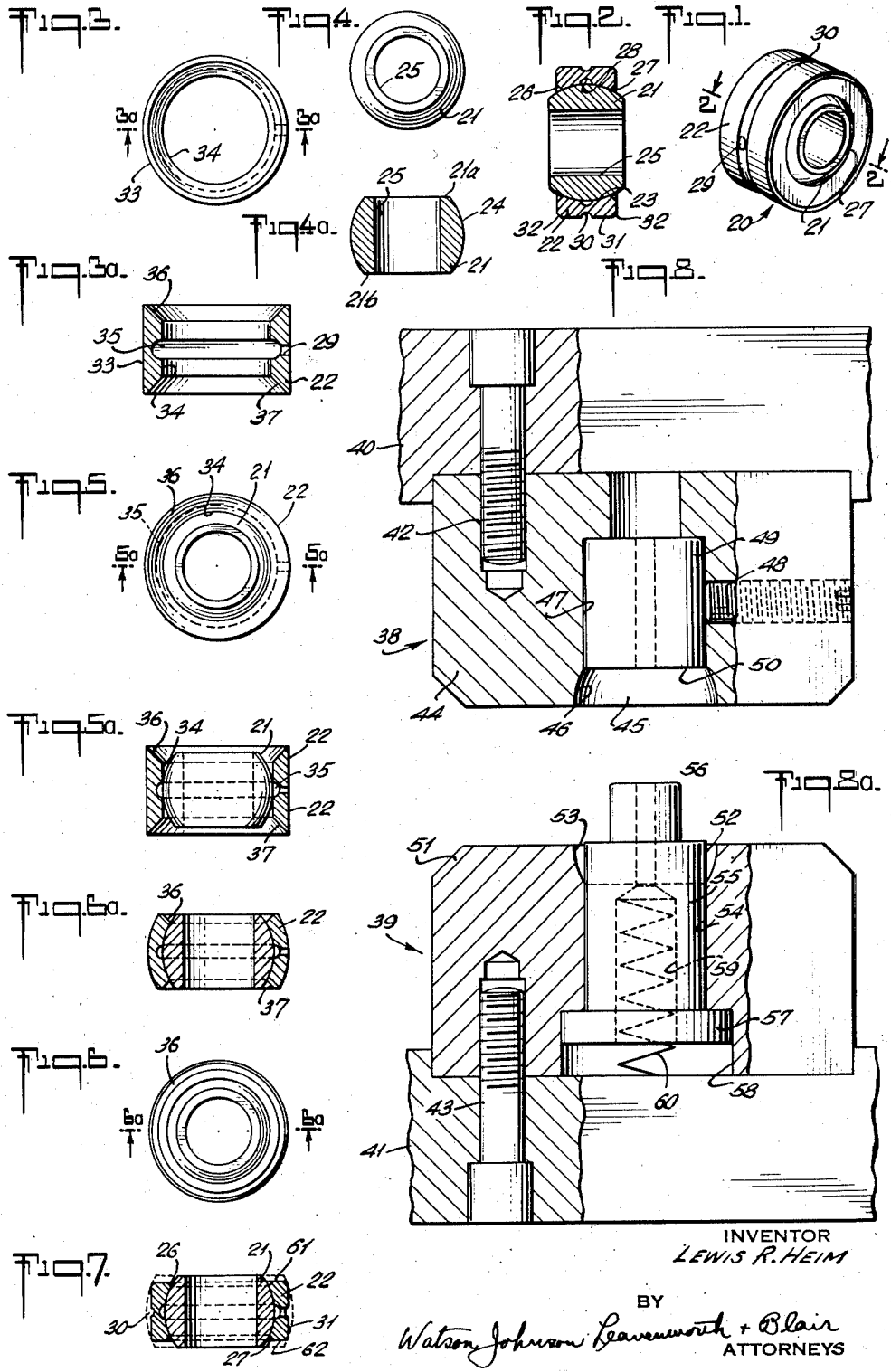
INVENTOR
LEWIS R. HEIM
BY
Watson Johnson Leavenworth + Blair
ATTORNEYS April 2, 1957  L. R. HEIM  2,787,048
METHOD OF MAKING SELF-ALIGNING BEARINGS
Filed Aug. 20, 1953  3 Sheets-Sheet 2
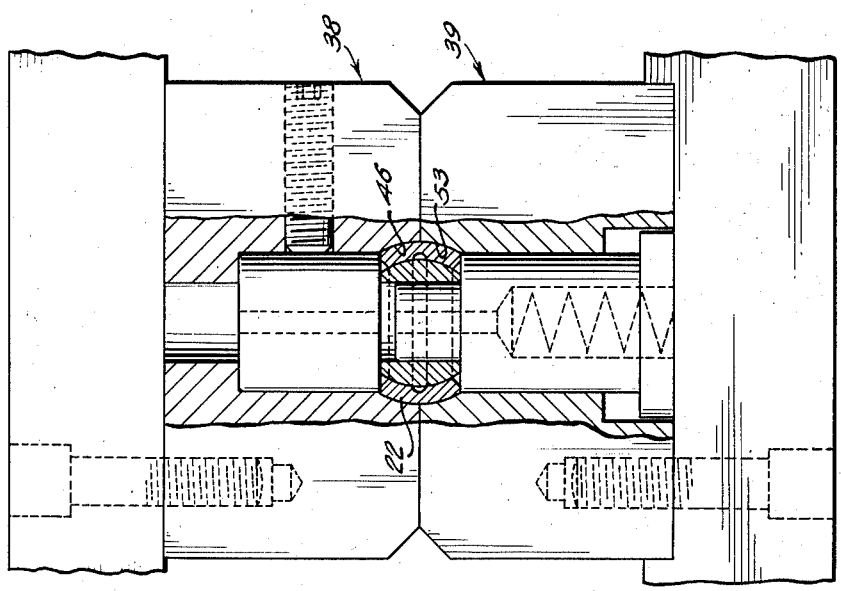
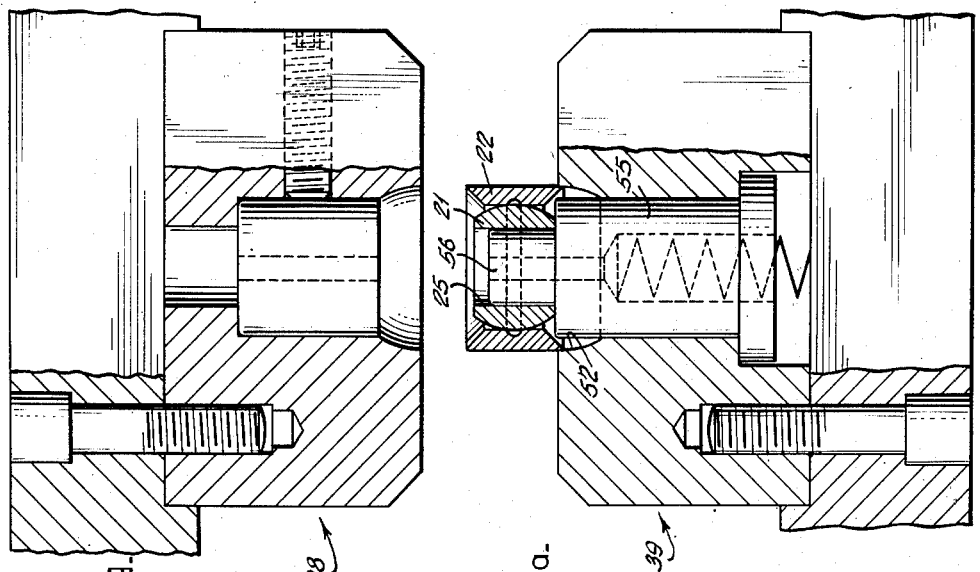
INVENTOR
*LEWIS R. HEIM*
BY
*Watson, Johnson, Leavenworth & Blair*
ATTORNEYS

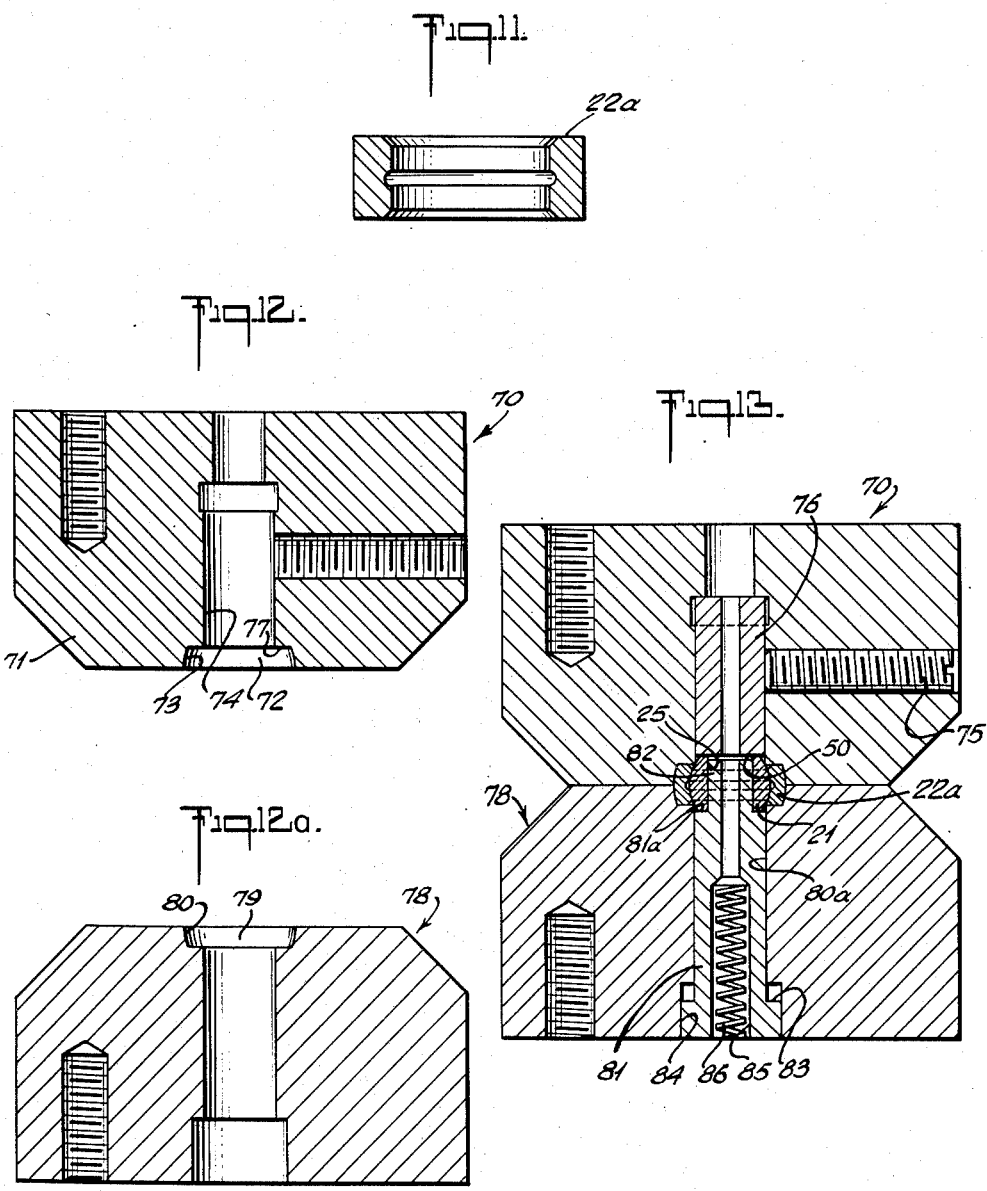

United States Patent Office 2,787,048
Patented Apr. 2, 1957

2,787,048
METHOD OF MAKING SELF-ALIGNING BEARINGS
Lewis R. Heim, Fairfield, Conn.
Application August 20, 1953, Serial No. 375,315
8 Claims. (Cl. 29—149.5)

This invention relates to self-aligning bearings and to a method of making the same.

An increasing number of industries and particularly in more recent times, the aircraft industry, require for different applications a small, light-weight, self-aligning bearing capable of withstanding loads of very substantial magnitude. Indeed in certain types of military aircraft, there are a number of connections requiring self-aligning bearings, which bearings must be capable of withstanding loads at least equal to or in excess of the double shear value of the supporting bolt or pin. There are, of course, different types of bearings having such capacity, but they are almost invariably so bulky and heavy as to be unsatisfactory in view of the usual weight and space limitations in aircraft.

To fulfill such requirements the bearing must accordingly be small but rugged, and must have the capacity to withstand heavy radial and axial loads and be able to function properly over extended periods of time without attention, replacement or repair.

Ideally, such a bearing comprises but two parts, namely an inner spherical bearing member having an axial bore extending therethrough and a race having a spherical bearing surface in which the bearing member or ball is retained. The bearing may be either of two types, depending upon its application, i. e. either a rod end bearing or a so-called spherical bearing, both of which types are shown in my U. S. Patent 2,488,775. For illustrative purposes, I shall hereinafter confine my disclosure to the spherical type, it being understood, however, that the rod end type is equally within the contemplation of my invention. Accordingly where, hereinafter, the term "bearing" is used it will be understood that reference is had to a self-aligning bearing of either the rod end or spherical type.

Where the bearing comprises but two parts and is required to withstand the immense loads referred to, the more malleable materials, such as bronze, are unsatisfactory for the race; accordingly steel of the proper carbon content, e. g. S. A. E. 52, 100 should be used. Thus if the race, as compared to the ball, is relatively soft, the imposition of the great loads referred to may distort the race to such an extent as to ruin the accuracy of the bearing relationship between the ball and the race. To preclude such distortion the race should be approximately as hard as the ball, and it is not unusual that the ball in bearings of this type has a rockwell "C" hardness of the order of 62–64.

If then the race is equally hard, the difficulty of installing it around the ball, so as not only to lock the ball in place, but also to provide the requisite accuracy, is obvious. It is difficult if not impossible to cold work steel of such hardness, and it is not feasible to hot work the race.

It is accordingly among the objects of my invention to provide a two-piece self-aligning bearing characterized by a high degree of accuracy, and having an unusually high load capacity. A further object of my invention is to provide a simple, inexpensive and highly efficient method of making such a bearing.

The invention accordingly consists in the features of construction, combinations of elements, arrangements of parts, and in the several steps and relation and order of each of the same to one or more of the others, all as will be illustratively described herein, and the scope of the application of which will be indicated in the appended claims.

In the drawing wherein I have shown one embodiment of my invention,

Figure 1 is a perspective view of my self-aligning bearing;

Figure 2 is a section taken along the line 2—2 of Figure 1;

Figure 3 is an elevation of the race of my bearing illustrative of one of the initial operations in the practice of my method of making the bearing;

Figure 3A is a section taken along the line 3A—3A of Figure 3;

Figure 4 is an elevation of the ball member of my bearing;

Figure 4A is a vertical section of the ball member shown in Figure 4;

Figure 5 is an elevation illustrating the initial assembly of the race and ball shown in Figures 3 and 4;

Figure 5A is a section taken along the line 5A—5A of Figure 5;

Figure 6 is an end elevation illustrating the appearance of the assembled race and ball subsequent to a coining operation which conforms the bearing surface of the race to that of the ball;

Figure 6A is a section taken along the line 6A—6A of Figure 6;

Figure 7 is a sectional view taken along a line similar to the line 6A—6A of Figure 6, illustrating the results of a machining operation on the race;

Figures 8 and 8A are fragmentary elevations, with portions thereof broken away and shown in section, illustrating upper and lower die members adapted for installation in a press for assembling the race and ball members of my bearing;

Figures 9 and 9A are views similar to Figures 8 and 8A, but showing the race and ball members in position for assembly;

Figure 10 is a partially broken away sectional elevation showing the two die members closed with the race of the bearing coined about the spherical surface of the ball;

Figure 11 is a view similar to Figure 3A, showing the initial conformation of a modified form of the race member;

Figures 12 and 12A are sectional elevations illustrating modified upper and lower die members adapted for installation in a press for assembling the race shown in Figure 11 with the ball member; and Figure 13 is a sectional elevation showing the two die members of Figures 12 and 12A closed, with the race of Figure 11 coined about the spherical surface of the ball.

Similar reference characters refer to similar parts throughout the views of the drawing.

In that embodiment of my invention disclosed herein, the self-aligning bearing comprises two parts, a ball or inner member and a race. The ball has a spherical bearing surface and an axial bore of a diameter dimensioned in accordance with its application, the bearing surface of the ball preferably being ground or polished to a close tolerance; the ball is formed from a suitable relatively soft steel and then heat-treated illustratively and preferably to a Rockwell "C" hardness of the order of 62–64. The race is of similar hardness, is preferably of less axial length than the ball and has a cylindrical outer diameter machined to a close tolerance where the bearing is in the nature of the aforementioned spherical bearing, so as readily to be adapted for installation where a close or press-fit is desired. The inner diameter of the race, i. e. its bearing surface, is spherical, and is such as to permit easy relative movement between the two parts, while precluding excessive play. If desired, a lubrication groove may be provided in the inner or bearing surface of the race, and preferably the edges of the bearing surface of the race are beveled toward the axis thereof. Where the aforementioned lubrication groove is provided, I have found it advantageous to drill the race radially to provide a lubrication conduit from the exterior surface thereof to such groove.

Of course, where the bearing is of the rod end type, it is not necessary that the outer diameter of the race be of cylindrical form, but otherwise the same specification may obtain. It should be noted that whether the bearing be of the spherical or rod end type, in order for either to withstand the heavy loads to which each is adapted to receive, the race as well as the ball should illustratively and preferably have a hardness of the order of Rockwell "C" 62–64, this order of hardness being readily attainable where both the ball and race are fabricated from S. A. E. 52, 100 steel, for example. In specifying this grade of steel, however, I do not wish to limit myself as other grades or metals may well be adaptable under suitable heat treating to give the requisite hardness quality.

In accordance with one embodiment of my method of fabricating this bearing, I preferably first form the inner spherical member or ball in any suitable manner, providing an axial bore theerthrough. To attain the requisite hardness, I have found it convenient to use a steel, such as S. A. E. 52, 100, for example. I then heat treat the ball to harden it, and finish its spherical bearing surface by grinding or polishing it within narrow tolerance limits. I have found it convenient to form the race of steel bar or tube stock, of the nature of, for example, S. A. E. 52, 100 steel, in a screw machine, under certain circumstances holding the inner diameter of the race to a dimension the same as, or very slightly less than the diameter of the ball. In machining the race, I preferably inwardly taper or bevel the ends thereof, and machine an equatorial lubrication groove in the inner surface thereof.

Under certain circumstances, as, for example, where the bearing will be subject to corrosive agents, it may be desirable to apply to the ball and race surfaces or either of them a protective or corrosion resistant covering such as, for example, a coating of silver, copper, rhodium, or nickel, or any other suitable material.

With the two pieces of the bearing so far fabricated, I then assemble the parts, which, where the inner diameter of the race is slightly less than the outer diameter of the ball, necessitates the application of a slight degree of pressure on the ball to force it into the race. With the I. D. of the race and the O. D. of the ball so dimensioned, the two parts conveniently remain in assembled relation and thus facilitate subsequent handling.

With the two parts so assembled, the assembly is placed between dies installed in a suitable press, and these dies are then brought together to coin the cylindrical race about the bearing surface of the ball, with the result that the initial inner cylindrical surface of the race is conformed to the outer spherical surface of the ball as to create a concavo-convex interrelationship. During this coining operation, the outer surface of the race also has imparted thereto a spherical conformation. In view of the very substantial pressure requisite to effect this coining operation, the inner or bearing surface of the race and the outer bearing surface of the ball are intimately engaged as to preclude relative movement therebetween. In other words, the ball and race are frozen.

After the ball and race are thus assembled, such assembly may be mounted on an arbor or other suitable mounting device for the trimming of the race, as usually it is desirable that the outer surface of the race be cylindrical and that the axial dimension of the race is less than that of the ball. As noted hereinbefore, the race ends preferably are inwardly tapered; this facilitates the trimming of the ends of the race without risking marring of the ground or polished bearing surface of the ball.

Alternatively and to avoid the trimming of the race ends, the race may initially be given its final axial length so that after the coining operation referred to only the periphery of the race needs to be finished.

As noted hereinbefore, the coining operation which assembles the race about the ball results in a tight fit between these two parts. Subsequent to the trimming of the race, it may be desirable, and in certain cases it may be preferable, that this tight fit between the race and ball be wholly or partially freed. This may be conveniently accomplished in accordance with the method disclosed in my United States Patent No. 2,476,728. However, whether the race and ball are partially or wholly freed or not, in order to impart to the race that hardness which is requisite in a bearing of this type, I heat treat the assembly in accordance with well-known techniques so that upon cooling, the race will have a Rockwell "C" hardness of the order of that of the ball. As noted hereinbefore, in order to withstand the heavy loads to which a bearing of this type is subjected, the hardness value may be illustratively and preferably of the order of Rockwell "C" 62–64, although different hardness values may be imparted in accordance with the use to which the bearing is to be put. I have discovered that the heat treatment results in freeing thee mating bearing surfaces of the race and ball to that amount requisite in certain types of commercial bearings without resulting in a sloppy fit. It may be that coining the race about the ball as above described results in the creation, in the race, of internal stresses that are sufficiently relieved during the heat treatment as to produce the requisite freedom between the bearing surfaces of the two parts.

After such heat treatment of the assembled bearing, the outer surface of the race may be machined in any desired manner in accordance with commercial specifications.

Referring now to Figures 1 and 2 of the drawing, my bearing is generally indicated at 20, and comprises an inner spherical member or ball 21 and an outer member or race 22, having an inner bearing surface 23 of spherical conformation mating with the spherical bearing surface 24 of ball 21 so that when assembled the ball and race are interlocked with their bearing surfaces in concavo-convex relationship. As shown in Figure 2, the axial length of ball 21 is preferably greater than that of race 22 in order to provide adequate relative movement between these two parts to compensate for any misalignment encountered in the particular application of the bearing. Ball 21 is provided with an axial bore 25 to accommodate any shaft or pin, or other part, which the bearing is to support.

Race 22 is preferably provided with inwardly and axially directed bevels 26 and 27 at its opposite, inner ends, and also has an internal lubrication groove 28 and a radially extending lubrication hole 29 (Figure 1) which communicates with groove 28. The outer circumference of race 22 may also be provided with a groove 30 communicating with hole 29 and accordingly groove 28 (Figure 2) thus to provide adequate means for the flow of lubrication to the mating bearing surfaces of the ball and race.

The material comprising ball 21 and race 22 is hardened steel of illustratively and preferably Rockwell "C" 62–64, and accordingly the bearing has extremely high load capacity. Indeed, tests indicate a capacity at least equal to or in excess of the double shear value of the supporting bolt or pin. I have found that a suitable steel from which the ball and race may be fabricated is one having a Rockwell "B" value of approximately 85–90, for example, S. A. E. 52, 100, although other metals may be satisfactory depending on the circumstances. Preferably, however, ball 21 and race 22 have substantially the same Rockwell "C" hardness value, thus enabling the bearing adequately to withstand both radial and thrust loads.

As shown in Figure 2, race 22 preferably is cylindrical with respect to its outer periphery 31, and in many cases this surface should be finished to close tolerances, particularly where the bearing is to be installed by a close or force fit. I have also found it convenient to provide the edges of the outer periphery of race 22 with bevels 32. It may accordingly be seen that my bearing is well adapted for various applications where possible shaft misalignment may be encountered, or where oscillatory shaft movement must be accommodated.

While my above-described bearing may be made by different methods, I have found the hereinbelow described embodiment of my method of making this bearing to be well adapted to known and available shop techniques, and also highly economical and efficient. Accordingly I fabricate the outer member or race 22 by machining bar or tube stock of suitable steel, e. g. S. A. E. 52, 100 in a screw machine or any other suitable machine tool in such a manner as to produce the member shown in Figures 3 and 3A. This member might be considered as an annulus or cylindrical part having concentric inner and outer surfaces 33 and 34, the latter, as shown in Figure 3A, being provided with an equatorial lubrication groove 35. The ends of the member are machined to provide inwardly and axially directed tapers or bevels 36 and 37, which ultimately provide the bevels 26 and 27 (Figure 2) referred to hereinbefore. Subsequent to the fabrication of this member the lubrication hole 29 may be drilled therein to communicate the exterior of the member with lubrication groove 35. The inner member or ball 21 is fabricated (Figures 4 and 4A) in such a manner as to provide bore 25, and I machine the ball as to provide the end faces 21a and 21b. Ball 21, so formed, is then preferably heat-treated as to impart thereto the desired Rockwell "C" hardness value, after which its bearing surface 24 is ground and/or polished so that the value of the radius of the ball falls within narrow tolerance limits.

Preferably the diameter of ball 21 is the same as, or very slightly in excess of the diameter of surface 34 of the race member shown in Figure 3A, for the reasons disclosed hereinafter.

Figures 5 and 5A illustrate the initial assembly of the ball and race members comprising my bearing. As shown in Figure 5A, ball 21 is disposed in race 22 in such a manner that with the axes of the ball and race coincident, the equator line of the ball registers approximately with the center of lubrication groove 35. As noted hereinbefore, the diameter of ball 21 is the same as or very slightly in excess of that of the inside surface 34 of the race. With such diameter values, a slight amount of pressure must be exerted upon the ball to install it within the race in order to force it past the bearing surface 34 of the race until the equator line of the ball registers with lubrication groove 35 so that the ball will be relatively loosely, but nevertheless adequately held within the race as to preclude inadvertent disassembly of the parts, thus to facilitate subsequent handling. It should be noted that the race member 22 has a Rockwell "C" hardness value less than that of the ball prior to its initial assembly with ball 21. Thus the material of which the race is formed remains in workable condition for the following operation now to be described.

If desired this preliminary assembly operation may be dispensed with. In such case, the diameter relationship between the ball and race, as described above, does not obtain, the I. D. of the race being preferably slightly greater than the O. D. of the ball. With the parts so dimensioned, the ball may be installed in the die set (Figure 9A), and the race then slipped over the ball, as shown.

After assembly of the ball and race into the condition shown in Figure 5A, the two pieces are placed between the elements of the die set shown in Figures 8–10. This die set comprises an upper die, generally indicated at 38 (Figure 8), and a lower die, generally indicated at 39 (Figure 8A), these dies being respectively held by members 40 and 41, by way of bolts 42 and 43, the members 40 and 41 comprising conventional parts of a press (not shown). Upper die 38 (Figure 8) may comprise a block or body 44, within which is formed a cavity 45, having a forming surface 46, this cavity communicating with a bore 47 in the body 44 within which is disposed and held, as by a set screw 48, a cylindrical block 49, the bottom 50 of this block forming the upper surface of cavity 45.

Lower die 39 (Figure 8A) also includes a block or body 51, within which is formed a cavity 52 having a forming surface 53 similar to surface 46 of upper die 38, the depth of cavity 52 also being approximately the same as that of cavity 45. Cavity 52 communicates with a bore 54 in body 51, and this bore reciprocably and slidably receives a retriever element 55 having a reduced end 56 and a stop gauge 57, the latter being received in an enlarged bore 58 formed in the block. Retriever 55 also has a central bore 59, in which is disposed a coiled spring 60 which imparts constant upward bias to retriever 55. The reduced end 56 of retriever 55 is of slightly less diameter than that of hole 25 in ball 21, thus conveniently to receive, as shown in Figure 9A, the race and ball assembly.

It may now be seen that when this ball and race assembly are placed between the upper and lower dies 38 and 39, as shown in Figures 9 and 9A, the reduced end 56 of retriever 55 extends into hole 25 of ball 21 to hold the ball and race members as initially assembled in proper position between the two die members, with the lower edge of race 22 barely entering cavity 52 of lower die 39. Thus positioned, the ball and race are properly set for operation of the dies.

When upper and lower dies 38 and 39 are brought together, upon operation of the press, the forming surface 46 of upper die cavity 45 and the forming surface 53 of lower die cavity 52 embrace the periphery of race member 22, and by reason of their conformation impart to the outer surface of race member 22 the conformation illustrated in Figure 6A. Very substantial pressure, of course, is exerted by the dies on the race member in order to distort the material thereof sufficiently to bend or coin it around the outer bearing surface of ball 21. It is, of course, necessary if the outer race is to remain coined, that its elastic limit be exceeded and of course in so doing the inner surface of the race and the outer surface of the ball are so intimately engaged that the race and ball are frozen. Also, internal stresses are probably created within the material of the race. It should be noted that by reason of the prehardening of the ball and its support on reduced end 56 of retriever 55, the dimensional characteristics of the ball are not substantially affected during the coining of the race member about it. It will now be seen that after the coining of the race about the ball, the assemblage has the appearance of the unit shown in Figures 6 and 6A.

Upon opening of the dies 38 and 39, spring 60 (Figure 8A) forces retriever 55 upwardly, accordingly forcing the ball and race assembly out of lower cavity 53, thus facilitating removal of the assembly for the subsequent operation.

The assembly of Figures 6 and 6A is next placed on an arbor, or any other suitable support, and is machined to the form shown in Figure 7 where, it will be seen, race 22 is trimmed to provide opposed faces 61 and 62 and outer cylindrical surface 31. By virtue of the provision of bevels 36 and 37 (Figure 3A), faces 61 and 62 may easily be machined without endangering the bearing surface of ball 21. At this time also, if desired, groove 30 (Figure 7) may be cut in race 22.

Under certain circumstances, I have found it desirable to form the race member in such a manner as to obviate the necessity of trimming the end faces thereof, in the manner just described. In this alternative method, I form the race member in a manner similar to that described with respect to race member 22 but, as shown in Figure 11, the race 22a has a lesser axial dimension, of a value substantially that of its ultimate from. Otherwise this race member is the same as that shown in Figure 3A. In other words, race member 22a has a lesser axial length than that of ball 21 (Figure 4A), so that when the race and ball are placed in a die set and the two dies are closed, as hereinbefore described, the race is coined about the ball and does not need any subsequent trimming to provide it with its ultimate required axial length.

The die members used in this operation are shown in Figures 12–13, and are substantially similar to those shown in Figures 8–10. Thus, as shown in Figures 12 and 12A, an upper die, generally indicated at 70, may comprise a block or body 71, within which is formed a cavity 72 having a forming surface 73, this cavity communicating with a bore 74 in the body 71 within which is disposed and held, as by a set screw 75 (Figure 13), a cylindrical block 76, the bottom 50 of which bears against the top of ball 21 when the dies are closed. Die 70 also includes a shoulder 77 (Figure 12) which, as shown in Figure 13, bears against the upper side of race member 22a when the dies are closed.

The die set includes a lower die generally indicated at 78 (Figure 12A), within which is formed a cavity 79 having a forming surface 80 similar to surface 73 of upper die 70, the depth of cavity 79 also being substantially the same as that of cavity 72. Cavity 79 communicates with a bore 80a (Figure 13) in the body of lower die 78, and this bore reciprocably and slidably receives a retriever element 81 having a reduced end 82 and a stop flange 83, the latter being received in an enlarged bore 84 formed in the lower die. Retriever 81 also has a central bore 85 in which is disposed a coiled spring 86 which imparts constant upward bias to the retriever. The reduced end 82 of retriever 81 is of slightly less diameter than that of hole 25 in ball 21, thus conveniently to receive the race and ball assembly.

It may now be seen that when the assembly comprising race 22a and ball 21 is placed between the upper and lower dies 70 and 78 (as shown in Figure 13), the reduced end 82 of retriever 81 extends into hole 25 of ball 21 to hold the ball and race member in proper position between the two dies in such a manner that the lower edge of race member 22a barely enters the largest diameter of cavity 79 (Figure 12A) of the lower die. Thus, the bottom face of ball 21 rests against the shoulder 81a of retriever 81. Thus positioned, the ball and race are properly set for operation of the dies.

When upper and lower dies 70 and 78 are brought together upon operation of the press, the forming surface 73 of upper die cavity 72 and the forming surface 80 of lower die cavity 79 embrace the periphery of race member 22a, and by reason of their conformation impart to the outer surface of the race member the conformation illustrated in Figure 13. Because of the substantial pressure exerted by the dies on the race member, it is bent or coined around the outer bearing surface of ball 21, as described hereinbefore with respect to the race member shown in Figure 3A. By reason, however, of the initial shorter axial length of race member 22a and the modification of the dies as shown in Figures 12–13, the subsequent trimming operation is obviated.

As noted hereinbefore, coining race 22 about ball 21 (Figure 6A), freezes the two parts, and it may be desirable under certain circumstances partially to free the race and ball, or indeed, under other circumstances, it may be desirable wholly to free the two parts so as to impart thereto that degree of easy relative movement or clearance commercially necessary. This freeing of the race and ball may be effected, for example, by the method shown in my Patent No. 2,476,728, or the race and ball may be freed in accordance with the method disclosed in my copending application, Serial No. 184,803, filed September 14, 1950.

As pointed out hereinbefore, in order that the bearing have the requisite load capacity, the race should be substantially as hard as the ball and should have substantially the same tensile strength. Accordingly, after the race has been trimmed, I subject the thusly assembled race and ball to any suitable heat treatment capable of imparting to the race that degree of hardness as may be required. Such heat treatment does not finally affect the hardness characteristics of the ball, so that after such heat treatment, both the race and ball have substantially the same degree of hardness. I have discovered that in the course of such heat treatment, the race and ball are freed to such an extent that in many cases the specified clearance therebetween is effectively attained without resorting to the preliminary freeing operation.

As pointed out above, clearance between the ball and race may be effected by a preliminary freeing of the race and ball with the ultimate clearance being attained by the heat treatment. Or, depending upon the amount of clearance desired, requisite freedom between the race and ball may be attained by heat treatment. In other words, through the practice of my invention, I provide a novel method of clearance control whereby any desirable or specified clearance value is accurately obtainable by a judicious combination of preliminary freeing and subsequent heat treatment.

For example, if the specifications include a clearance value of .00X", it may be accurately attained by heat treatment without the preliminary freeing operation to which I shall, for convenience, refer to as "bumping." If, however, a clearance value of .00Y" is called for, I may bump the bearing prior to heat treating with a pressure of 1000#, for example, thus partially freeing the ball and race with the ultimate desired clearance being attained by heat treatment. Again if a clearance value of .00Z" is specified, the bearing may be bumped with a 5000# pressure and then heat treated to provide the required clearance. Thus it may be seen that any desired clearance within reasonable limits is accurately attainable in a simple and inexpensive manner.

It will accordingly be seen that I have attained the several objects hereinbefore set forth in a thoroughly practical and efficient manner.

As many possible embodiments may be made of the mechanical features of the above invention, and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. The method of making a self-aligning bearing which includes the steps of, forming an inner bearing member having a surface of revolution, heat treating said bearing member to harden it, forming a cylindrical race ring of metal softer than that of said hardened member and with an inner diameter slightly less than the diameter of said bearing member, forming an oil groove in the inner surface of said ring substantially centrally thereof, pressing said bearing member into said ring until its equator line registers with said groove, exerting substantial pressure simultaneously on the opposite ends of said ring in both axial and radially inward directions sufficient to exceed the elastic limit of the metal of which the ring is formed thereby to force the inner diameter of the ring into such tight engagement with the surface of said bearing member as to preclude relative movement between the ring and member, and heat treating the thusly assembled member and ring so that each is of the same hardness and whereby the internal stresses in said ring are relieved to permit relative rotation between the member and ring.

2. The method of making a self-aligning bearing which includes the steps of, forming an inner bearing member having a surface of revolution, heat treating said bearing member to harden it, forming a cylindrical race ring of metal softer than that of said hardened member, beveling the opposite inner edges of said race ring, placing said bearing member in said ring, exerting substantial pressure simultaneously on the opposite ends of said ring in both axial and radially inward directions sufficient to exceed the elastic limit of the metal of which said ring is formed thereby to force the inner diameter of the ring into such tight engagement with the surface of said bearing member as to preclude relative movement between the ring and member, reducing the axial length of said ring at each end thereof by an amount less than the axial depth of each of said bevels, and heat treating the thusly assembled member and ring so that each is of the same hardness whereby the internal stresses in said ring are relieved to permit relative rotation between the member and ring.

3. The method of making a self-aligning bearing which includes the steps of, forming an inner bearing member having a surface of revolution, heat treating said bearing member to harden it, forming a cylindrical race ring of metal softer than that of said hardened member, beveling the opposite inner edges of said race ring, placing said bearing member in said ring, exerting substantial pressure simultaneously on the opposite ends of said ring in both axial and radially inward directions sufficient to exceed the elastic limit of the metal of which said ring is formed thereby to force the inner diameter of the ring into such tight engagement with the surface of said bearing member as to preclude relative movement between the ring and member, reducing the axial length of said ring at each end thereof by an amount less than the axial depth of each of said bevels, and treating the thusly assembled member and ring to relieve the internal stresses in said ring sufficiently to permit relative rotation between the member and ring.

4. The method of making a self-aligning bearing which includes the steps of, forming an inner bearing member having a surface of revolution, heat treating said bearing member to harden it, forming a cylindrical race ring of metal softer than that of said hardened member, beveling the opposite inner edges of said race ring, placing said bearing member in said ring, exerting substantial pressure simultaneously on the opposite ends of said ring in both axial and radially inward directions sufficient to exceed the elastic limit of the metal of which said ring is formed thereby to force the inner diameter of the ring into such tight engagement with the surface of said bearing member as to preclude relative movement between the ring and member, reducing the axial length of said ring at each end thereof by an amount less than the axial depth of each of said bevels, and relieving the internal stresses in said ring sufficiently to permit relative rotation between the member and ring.

5. The method of making a self-aligning bearing which includes the steps of, forming an inner bearing member having a surface of revolution, heat treating said bearing member to harden it, forming a cylindrical race ring of metal softer than that of said hardened member, beveling the opposite inner edges of said race ring, placing said bearing member in said ring, exerting substantial pressure simultaneously on the opposite ends of said ring in both axial and radially inward directions sufficient to exceed the elastic limit of the metal of which said ring is formed thereby to force the inner diameter of the ring into such tight engagement with the surface of said bearing member as to preclude relative movement between the ring and member, reducing the axial length of said ring at each end thereof by an amount less than the axial depth of each of said bevels, moving said bearing member relative to said ring to relieve the tight engagement therebetween to permit relative rotation between the member and ring, and heat treating the thusly assembled member and ring so that each is of the same hardness.

6. The method of making a self-aligning bearing which includes the steps of, forming an inner bearing member having a surface of revolution, heat treating said bearing member to harden it, forming a cylindrical race ring of metal softer than that of said hardened member, beveling the opposite inner edges of said race ring, placing said bearing member in said ring, exerting substantial pressure simultaneously on the opposite ends of said ring in both axial and radially inward directions sufficient to exceed the elastic limit of the metal of which said ring is formed thereby to force the inner diameter of the ring into such tight engagement with the surface of said bearing member as to preclude relative movement between the ring and member, reducing the axial length of said ring at each end thereof by an amount less than the axial depth of each of said bevels, moving said bearing member relative to said ring to relieve the tight engagement therebetween to permit relative rotation between the member and ring, and heat treating the thusly assembled member and ring to relieve internal stresses in said ring thereby to control the clearance between the member and ring.

7. The method of making a self-aligning bearing which includes the steps of, forming an inner bearing member having a surface of revolution, heat treating said bearing member to harden it, forming a cylindrical race ring member of metal softer than that of said hardened member, placing said bearing member in said ring member, exerting substantial pressure simultaneously on the opposite ends of said ring member in both axial and radially inward directions sufficient to exceed the elastic limit of the metal of which the ring member is formed thereby to force the inner diameter of the ring member into such tight engagement with the surface of said bearing member as to preclude relative movement between said members, subjecting said members to pressure as to move one of said members slightly relative to the other thereby to loosen said tight engagement as to permit relative rotation between said members, and heat treating the thusly assembled members so that each is of substantially the same hardness.

8. The method of making a self-aligning bearing which includes the steps of, forming an inner bearing member having a surface of revolution, heat treating said bearing member to harden it, forming a cylindrical race ring member of metal softer than that of said hardened member, placing said bearing member in said ring member, exerting substantial pressure simultaneously on the opposite ends of said ring member in both axial and radially inward directions sufficient to exceed the elastic limit of the metal of which the ring member is formed thereby to force the inner diameter of the ring member into such tight engagement with the surface of said bearing member as to preclude relative movement between said members, subjecting said members to pressure as to move one of said members slightly relative to the other thereby to loosen said tight engagement as to permit relative rotation between said members, and heat treating the thusly assembled members to relieve the internal stresses in said ring member thereby to control the clearance between said members.

References Cited in the file of this patent

UNITED STATES PATENTS

| Number | Name | Date |
| --- | --- | --- |
| 1,307,979 | Knapp | June 24, 1919 |
| 1,798,738 | Hoern | Mar. 31, 1931 |
| 2,252,351 | Paulus | Aug. 12, 1941 |
| 2,462,138 | Spangenberg | Feb. 22, 1949 |
| 2,476,728 | Heim | July 19, 1949 |
| 2,626,841 | Potter | Jan. 27, 1953 |